United States Patent [19]

Helen et al.

[11] Patent Number: 4,616,338
[45] Date of Patent: Oct. 7, 1986

[54] FIFO ARRANGEMENT FOR TEMPORARY DATA STORAGE

[76] Inventors: Andre Helen, 7, Allée des Fouchères, Louannec - 22700 Perros Guirec; Michel Servel, Le Rhu en Servel; Alain Thomas, Ar Santé L 222, both of 22300 Lannion, all of France

[21] Appl. No.: 551,840
[22] Filed: Nov. 15, 1983
[30] Foreign Application Priority Data Nov. 15, 1982 [FR] France ................. 82 19093

[51] Int. Cl.⁴ .................. G06F 12/00; G11C 7/00
[52] U.S. Cl. ........................... 364/900; 365/189
[58] Field of Search ............ 365/219, 220, 221, 239, 365/78, 73, 77, 189; 364/200 MS File, 900 MS File

[56] References Cited
U.S. PATENT DOCUMENTS

| 3,936,807 | 2/1976 | Edwards | 364/900 |
| 3,953,838 | 4/1976 | Gilberg et al. | 365/78 |
| 4,161,778 | 7/1979 | Getson, Jr. et al. | 364/900 |
| 4,463,443 | 7/1984 | Frankel et al. | 364/900 |

FOREIGN PATENT DOCUMENTS

0048586 3/1982 European Pat. Off.

Primary Examiner—Terrell W. Fears
Assistant Examiner—Guy M. Miller
Attorney, Agent, or Firm—Larson and Taylor

[57] ABSTRACT

A memory arrangement for temporary data storage of the FIFO type includes a random access memory associated with an input buffer register and two output buffer registers. The registers may consist of transparent flip-flops. The control system for the arrangement is provided for authorizing reading out from the output register at any time independently of the writing times in the random access memory and for causing reading out from the random access memory in response to an indication that the first output register is empty. A priority input of said control system makes it possible to interrupt a reading or writing operation when a request for the other operation is received. The control system has means for detecting full condition and empty condition of the FIFO. The control system further includes a handling logic for the output registers. That handling logic has two flip-flops which respectfully represent the presence of data in the two output registers and a circuit for setting the first flip-flop in response to loading of the first output register during an internal reading cycle in the random access memory and a circuit for emptying the second register and resetting the second flip-flop in response to a reading request by a user.

6 Claims, 8 Drawing Figures

FIFO ARRANGEMENT FOR TEMPORARY DATA STORAGE

BACKGROUND AND SUMMARY OF THE INVENTION

The invention relates to memory arrangements for temporary data storage of the type currently designated as "first in-first out" or "FIFO". It is suitable for use each time a buffer memory is necessary since there is no time coincidence between input signals representative of external events and the times for use of such signals. Examples of such use are data mixing, curve smoothening, conversion from an arrival frequency to a use frequency, and multiplexing. Two types of FIFO arrangements are presently used. In a first type, the data circulate along a stack of registers. In that embodiment, complete asynchronism between the writing and read out operations is possible. On the other hand, that arrangement has drawbacks: the storage capacity is severely limited. There is a substantial propagation time from the input to the output and that time increases when the storage capacity increases. In the other type, the FIFO arrangement includes a random access memory associated with a control logic. The storage capacity may be substantially increased, but complete asynchronism between the writing and reading operations is lost.

It is an object of the invention to provide a FIFO arrangement including a random access memory or RAM which is improved in that the access time is the same whatever the storage capacity while there is no need for a specific time relationship betwen reading and writing operations.

According to the invention, there is provided a FIFO arrangement for temporary data storage which includes:

a random access memory having an input and an output, a control system for said random access memory, a first and a second output buffer register connected in series relation to the output of said random access memory, an input buffer register connected to the output of said random access memory, wherein said control system includes:

a first control logic for controlling operation of said input buffer register, having:

first means for storing write request one at the time, second means for storing the condition of said input buffer register, said second means being operatively associated with additional means arranged for setting said second storing means in response to the presence of an external writing request stored in said first storing means when said second storing means are in a condition indicating that said input buffer register is empty, third means for generating an internal writing request signal and directing it to said random access memory when said second storing means indicate that said input buffer register is loaded and as long as said random access memory has not acknowledged said internal writing request, said third means being arranged and connected to reset said second storing means into a condition indicating that said input buffer register is empty when said writing request has been acknowledged, a second control logic having:

third storing means for storing the condition of said first output buffer register, fourth storing means for storing the condition of said second buffer register, supplemental means for generating an internal reading request and directing it to said random access memory when said third storing means are in a condition indicating that the first output buffer register is empty and as long as said reading request has not been acknowledged, and for resetting said third storing means into a condition indicating that said first output register is loaded as soon as the reading request has been acknowledged, a unit for setting said fourth storing means when the third storing means indicate that the first output register is loaded and said fourth storing means indicate that the second output register is empty, said unit being connected to simultaneously reset said third storing means into a condition indicating that said first output buffer register is empty, and means for setting said fourth storing means when the latter indicates said second output buffer register is loaded and after an external signal representative of a request for reading out of the said second output buffer register has been delivered, and a logic circuit for solving conflicts between an internal writing-in request and an internal reading-out request.

European Patent Application No. 00 48586 (SONY CORPORATION) discloses an arrangement comprising a random access memory associated with one input register and two cascaded output registers. However, such buffer registers are not functionally equivalent to the registers in the present invention and are not similarly controlled. Their purpose is to enable reading-out from the random access memory in synchronism with a read signal which is asynchronous with the write signals. That prior art arrangement was designed for processing television signals prior to recording on a VTR, such processing involving a frequency conversion. The control logic associated with the buffer registers is not adapted to handle asynchronism between randomly received write-in and read-out signals and was not designed to do so.

The invention will be better understood from the following description of a preferred embodiment and from the comparison which is made with the prior art. The description refers to the accompanying drawings.

DETAILED DESCRIPTION OF A PREFERRED EMBODIMENT

Figure 1:
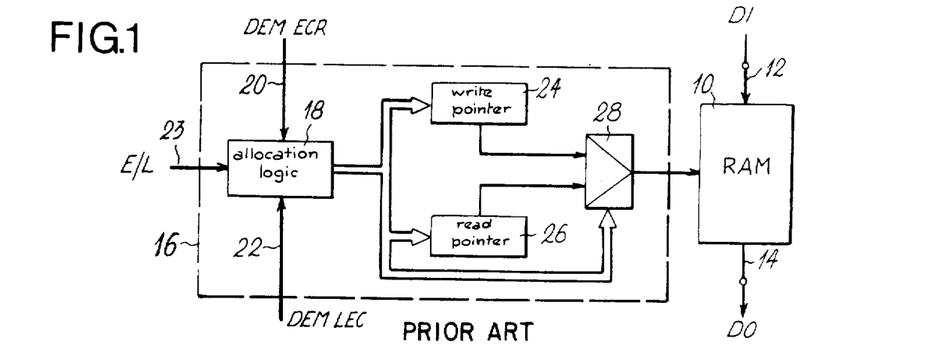
FIG. 1 is a simplified block diagram illustrating a prior art FIFO arrangement, whose main element is a RAM memory, FIG. 2, similar to FIG. 1, illustrates a temporary storage arrangement including a buffer register connected to the output of a RAM memory.

Before describing the invention, the general construction of a RAM memory storage unit arranged as a FIFO stack will be briefly recalled with reference to FIG. 1. The unit shown in FIG. 1 comprises a RAM 10 having an input 12 to which are applied the input data DI and an output 14 which delivers the output data DO in response to a read out request. The RAM 10 is associated with a control or handling system 16. The latter may be regarded as comprising an allocation logic 18 which receives at 20 and 22 the write in and read out requests. Logic 18 has a read or write E/L priority control input 23. It further comprises read and write pointers 24 and 26 for detecting the empty stack and full stack conditions and an address multiplexer 28.

The operation of such a unit is well known: the data to be written into RAM 10 are supplied at DI and a write request signal is applied. The data is acknowledged after a time duration depending on the read requests and on a priority rule. This time is indicated by the generation of an acknowledgment signal by the allocation logic 18. During read out, a request is effected which is acknowledged by the allocation logic 18. The data DO is made available at the output of RAM 10 after a variable time which will be, as for write in, marked by an enable signal.

The main disadvantage of such a unit is the lack of asynchronism between write-in and read-out because the memory forms a coupling point to which access cannot be had simultaneously for reading and writing in response to simultaneous requests at 20 and 22.

Figure 2:
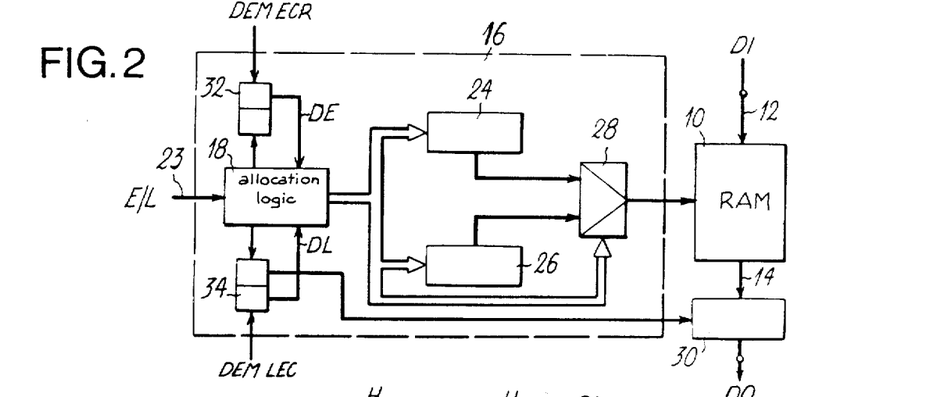

A first improvement, shown schematically in FIG. 2 (where the parts corresponding to those of FIG. 1 are designated by the same reference numbers) comprises an output buffer register 30 connected between the output of RAM 10 and the data output DO of the unit. The control or management system 16 must then provide handle of the output register as well. The user only as access to RAM 10 through that system. In FIG. 2, it is shown associated with the two latches 32 and 34. The read latch 34 receives the read requests DEM LEC from the user (telecommunication line input means for example). When this latch receives such a request, and an enable signal from logic 18, it is positioned at zero and generates a read request DL for reading out from RAM 10. As soon as a read cycle is granted, latch 34 will be repositioned to 1 and the register 30 reloaded.

Latch 32, which may, like latch 34, be integrated in logic 18, allows the RAM write request DE to be transmitted to RAM 10, the RAM access conflicts being settled depending on the priority selected by means of input 23.

The sequencing clock required for operation, supplying a clock signal at timing H, has not been shown in FIGS. 1 and 2. The periods of this clock determine the access cycle of the memory and the number of transactions can obviously not exceed the number of clock cycles, of period $T_H$.

Seen from the outside, the times for writing in the RAM and for reading out from the buffer register may be any whatsoever and may be possibly simultaneous. The internal operation is nevertheless synchronous and fixed by the clock, whose period $T_H$ must be compatible with the periods $T_L$ and $T_E$ of the read and write timings.

Since the period $T_H$ determines the frequency of possibilities of access to the RAM, the following inequality must in all cases be confirmed:

$$1/T_H \geq 1/T_L + 1/T_E \tag{1}$$

In the case of a symmetrical situation where $T_E = T_L > 3T_H$ a write request may always be satisfied during the presence $T_E$ of the information; it is sufficient to maintain this latter in parallel form for a period $T_E$ at the input of RAM 10 after having made a write request DEM LEC. Symmetrically, an information request DO at the output will be satisfied by reading out the information from register 30 for a time $T_L$ after a read request.

Figure 3:
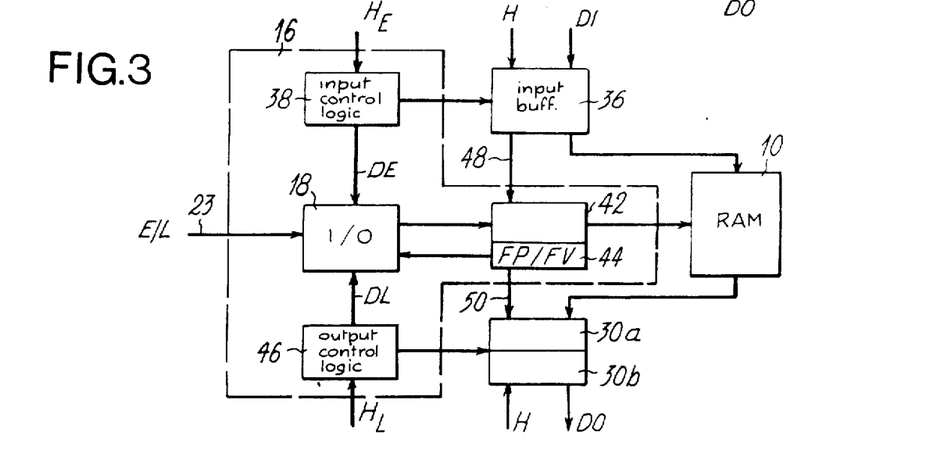
FIG. 3 is a simplified block diagram of a temporary storage unit according to the invention, having one input register and two cascaded output registers.

Referring to FIG. 3, the general diagram of a circuit applicable in all cases where the relationship (1) is satisfied will now be described without however obviously arriving at equality between the two terms of the relationship.

The circuit of which the principle is shown in FIG. 3 (where the parts corresponding to those of FIG. 1 bear the same reference number) comprises not only an output buffer register, but also an input buffer register 36 and, in addition, to take into account the fact that the read order $H_L$ can only be formulated if the data is already available at the output and does not leave, as was the case for write-in, a complete period $T_L$ pf $H_L$ available for satisfying the request, two cascade buffer registers 30a and 30b are provided instead of a single one.

The management system 16 may be regarded as comprising:

an input management logic circuit 38, associated with the input buffer register 36. Register 36 has a number n of binary elements or bits corresponding to that in each stored word. Logic 38 for managing the write register sends write requests to the allocation logic 18, a write/read allocation logic 18 which grants the cycles (at timing $T_H$) to reading or to writing depending on the request and on the priority accorded to one or other, set at 23, a circuit 42 for managing the write and read addresses in RAM 10 which comprises means 44 for detecting a full queue or an empty queue which block respectively the write or read requests which could not be served, a logic 46 for managing the two read buffer registers 30a and 30b, each formed of n bits.

Additional controls may be provided for using external registers (not shown) and increasing the length of the words beyond the number of bits of registers 36, 30a and 30b.

Figure 4:
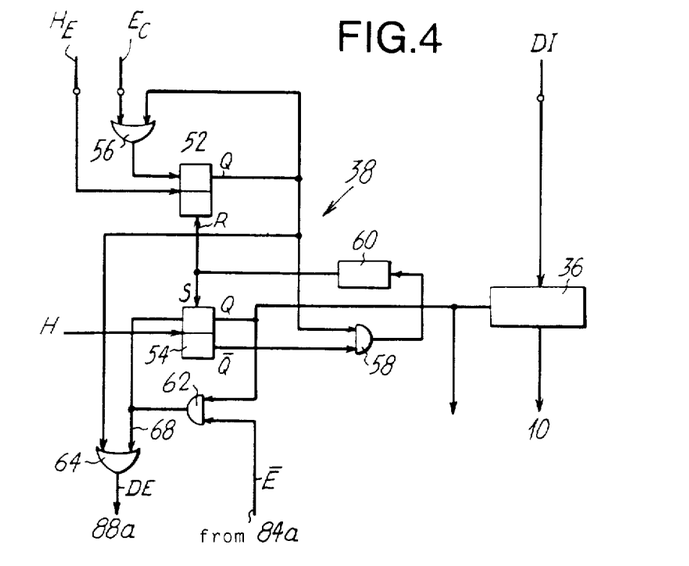
FIGS. 4, 5 and 6 are block diagrams which respectively illustrate an arrangement of an input handling logic, an output handling logic, and a write/read allocation logic suitable for use in the embodiment of FIG. 3.

The input management logic 38 may have the general construction shown in FIG. 4 which allows operation not only when the information comes from a series/parallel converter but also when it is directly available in parallel. This logic 38 is provided for loading register 36 asynchronously when two conditions are fulfilled: register 36 is empty and information DI is available at the input. Register 36 must then be loaded for temporary storage of the input information DI while awaiting transfer to the RAM 10.

For that, the input management logic comprises two latches 52 and 54.

Latch 52 is adapted to be positioned as soon as a load request is formulated at $E_C$. In the case where the information might be applied in parallel, a 1 would be permanently maintained at the input of latch 52 instead of the request signal $E_C$. As for latch 54, it is adapted to cause input information to be loaded into register 36 by passing to 1.

As shown in FIG. 4, the clock input latch 52, of type D, is connected to the write timing input $H_L$. The input of the latch is connected to the output of an OR gate 56 which receives the write request signal $E_C$ and the Q output of latch 52.

Latch 54 on its side receives the timing signal H at its clock input. Its $\overline{Q}$ output is connected to the inputs of an AND gate 58 whose other input is connected to the Q output of 52 and whose output comes back, through an element 60 providing a delay corresponding to the crossing time through a gate (whose role will appear further on), to the reset input R of latch 52 and the positioning input S of latch 54. The Q output of latch 54 also drives one of the inputs of an AND gate 62 whose output is connected, on the one hand, to the input of latch 54 and, on the other, to one of the inputs of an OR gate 64 whose output forms the request $D_E$ for writing in memory.

It can be seen that state 1 of latch 52 indicates that information is accessible at the input and that state 1 of latch 54 indicates that register 36 is full. Whereas latch 52 is positioned at 1 by an external action (signals $H_E$ and $E_C$), resetting of 54 is effected after each write cycle. The simultaneous existence of states 1 of 52 and 0 of 54 ensures resetting of the first latch and forcing of the second latch to 1.

More completely, the operation of the input management logic 38 is the following.

When information DI appears at the input of the queue, latch 52 is positioned to 1 by the request signal. If register 36 is empty (which corresponds to the state 0 at the Q output of latch 54), the AND gate 58 is then enabled and the level 1 signal at its output is transmitted to the S input of latch 54 through a delay circuit 60 which causes the Q output of latch 54 to pass to state 1, which causes register 36 to be loaded.

Moreover, the appearance of the level 1 signal at the output of the AND gate 58 results in resetting with the same delay (circuit 60) the Q output of latch 52, with a delay fixed by 60. The signal at the Q output of latch 52, which corresponds to a request for loading the input of register 36, is also transmitted, through an OR gate 64, to supply a request signal for writing in memory DE whose use will be explained in detail further on.

Latch 54 is controlled for resetting in a way timed by the clock which determines the duration of the periods of writing and reading in RAM 10. Latch 54 is only reset (which frees register 36 for further loading) when the AND gate 62 delivers a zero level signal, validated by clock H, i.e., when the signal $\overline{E}$ (E being the signal for controlling writing in RAM 10) at the second input of gate 62 is at the level 0 or, in other words, when a request for writing from the memory has been effected during the cycle preceding the clock pulse.

The output of the AND gate 62 is also connected to one of the inputs of the OR gate 64, for supplying a request signal DE for writing in RAM 10.

Thus, when the signal at the Q output of latch 52 disappears, by activation of the restoration input R, but when there has not been writing in RAM 10, register 36 is not available to be loaded again. The request for writing the information contained in register 36 into the RAM is maintained by the connection 68 between the output of the AND gate 62 and the OR gate 64.

The logic 46 for managing the output registers 30a and 30b may have a general construction similar to that of logic 38 associated with the input buffer register. In the case shown in FIG. 5, it further comprises two latches 70a and 70b of type "D", whose Q outputs drive this time the control inputs of registers 30a and 30b, respectively. The state 1 of latch 70a indicates the presence of information in register 30a. The state 1 of latch 30b indicates the presence of information in register 30B. Each cycle of internal reading in the RAM 10 loads register 30a and positions latch 70a to state 1. Reading caused by the application of signals $H_L$ and $L_E$ empties register 30b and resets latch 70b. As in the case of writing, the circuit lends itself just as well to the case where it is desired to use the output information from the storage unit in series mode as to the case where it is desired to have it available in parallel form, with the same modifications for driving the latches.

Figure 5:
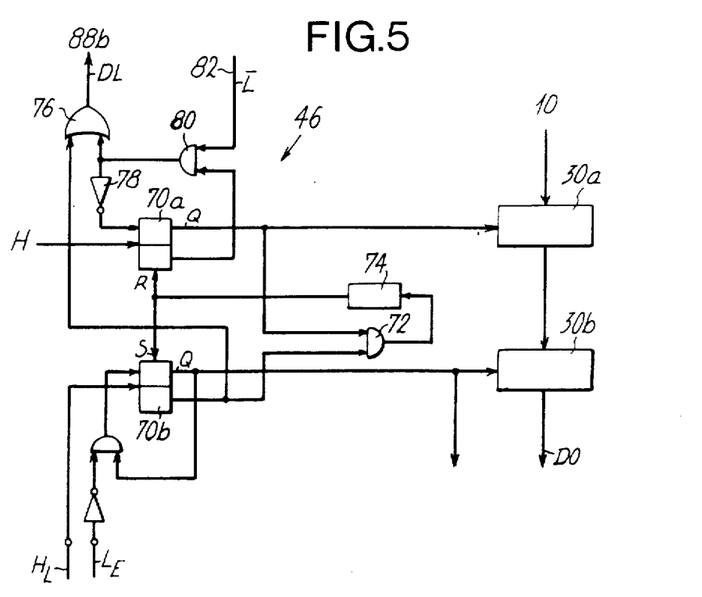

The operation of logic 46 is the following: in their normal state, before reading from register 30b, registers 30a and 30b are loaded respectively by the information of rank n and n+1 from the RAM 10. Reading from register 30b frees this latter for loading with the following information. It results in resetting the Q output of latch 70b. At this time, since latch 70a has its Q output at state 1, an AND gate 72 (whose inputs are connected to the Q output of 70a and $\overline{Q}$ of 70b) delivers a signal which acts, with a delay set by an element 74, on the positioning input S of latch 70b, thus transferring into register 30b the information contained in 30a and indicating a new occupied state of 30b. The signal is also applied to the reset input of latch 70a, which frees register 30a of the information which has just been transferred into register 30b. The $\overline{Q}$ output of 70b feeds a request DL for reading from RAM 10 through an OR gate 76. Latch 70a, controlled in sequence by the same clock H as latch 54 of the input logic, is set to 1 when a 1 appears at the output of inverter 78 which receives a zero from the AND gate 80. This setting or positioning of latch 70a takes place when connection 82 receives the signal $\overline{L}=0$ (L being the signal for controlling reading from memory) i.e. when reading from memory has been requested and ordered. As long as this read request has not been ordered, the output of gate 80 remains at 1 and maintains a request for reading RAM 10 through the OR' gate 76.

The write/read allocation logic 18 has an essential role. It will allow mutual exclusion operation absolutely forbidding the simultaneous presence of an order for reading and an order for writing in RAM 10. This logic is provided so that any action formed by a read or write request, is only validated after inhibition of the other type of request, with possibility of supression or inhibition of the first request if this latter is indicated as non priority by the setting at 23. (FIG. 3).

Figure 6:
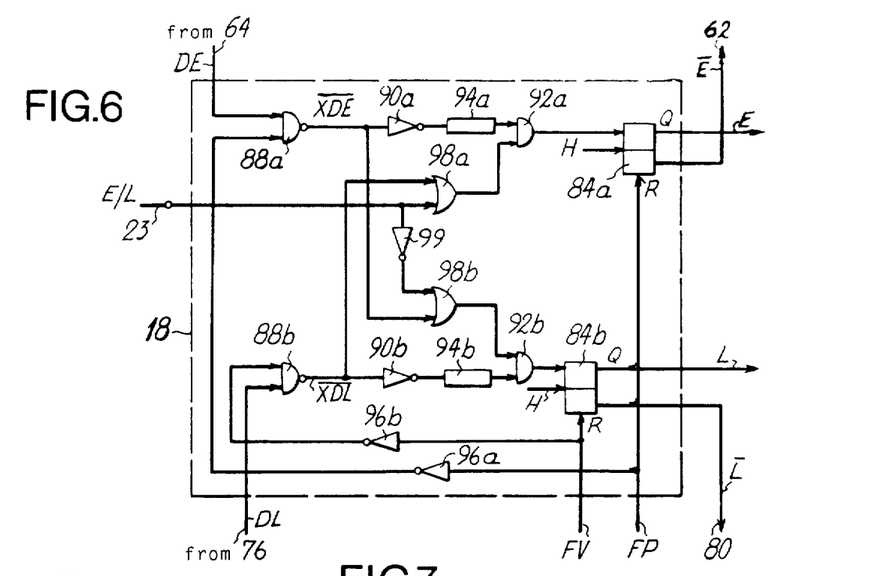

FIG. 6 shows one possible embodiment of the allocation logic 18 which effects the allocation depending on the requests DE and DL formulated by logics 38 and 46 (FIGS. 4 and 5). The role of the allocation circuit 18 is to attribute the square wave pulse supplied by the timing clock, of period $T_H$, to writing or to reading or to neither of them is there is no request. In the case of conflict, the priority must be given to writing or reading depending on the indication E/L supplied at 23.

The circuit comprises two latches 84a and 84b for indicating the allocation: state E=1 at the Q output of latch 84a indicates a writing cycle, state L=1 at the Q output of latch 84b indicates a read cycle. A mutual exclusion mechanism is provided for preventing the simultaneous rise of the two latches. It comprises, at each latch input, an inhibition AND gate 92a or 92b with two inputs. The first input receives the request signal DE or DL through a NAND gate 88a or 88b, an inverter 90a or 90b and an element 94a or 94b supplying a delay corresponding approximately to the duration of a gate crossing. This delay element 94a or 94b guarantees that inhibition of a latch is operational before action on the other latch. Logic 18 cooperates with means 44 for detecting a full queue or empty queue in the RAM. These means are provided for supplying limit signals FP and FV applied respectively to the reset inputs of latches 84a and 84b. The full stack and empty stack signals are also applied, through inverters 96a and 96b respectively, to the second inputs of the NAND gate 88a and 88b. These gates validate then the read or write allocation requests by a logic operation of the form:

$$XDE = DE \times \overline{FP}$$

$$XDL = DL \times \overline{FV}$$

A priority for writing is ensured by applying a logic 1 to input 23. This logic 1 is transmitted by the OR gate 98a to the exclusion AND gate 92a. Priority for reading is ensured by applying a logic 0 to input 23. In response, an inverter 99 applies a logic 1 to the OR gate 98b which transmits it to the AND gate 92b.

Operation of logic 18 is the following. If we assume a write request DE formulated when there is no conflict with a read request and when the queue is not full, the NAND gate 88a outputs a zero which is inverted by inverter 90a. The AND gate 92a then outputs a 1, with a delay set by element 90a, for in the absence of a read request the NAND gate 88b applies a 1 to the input of gate 92a through the OR gate 98a. The write request DE is then validated as a control E for writing in RAM 10.

Operation of the logic is identical for the read control, in the absence of conflict. It brings into play the part of the circuit symmetrical with that which has just been discussed (gates 88b, 92b, inverter 90b, latch 84b).

It should be noted in passing that priority in case of the simutaneous presence of a write request and a read request, materialized by the signal applied to the input 23, will be chosen to give priority to the highest rate of the read and/or write requests.

If the priority is given to reading, i.e. that a level 0 is applied to input 23, in the case of the simultaneous presence of DE and DL, assuming of course that the queue is neither empty nor full, the NAND gates 88a and 88b both supply a logic 0 which will be transformed into a 1 by the respective inverters 90a and 90b. Through the OR gates 98a and 98b and the inverter 99, the level 0 priority signal at 23 imposes a 0 on the second input of gate 92a and a 1 on the second input of gate 92b. This latter alone supplies a 1 which validates latch 84b for controlling read out from ram 10. The delay elements 94a and 94b prevent the simultaneous presence of read and write controls in the case where the priority request appears before the time when the decision is made, fixed by a pulse of clock H, whereas a non priority request is already present.

Between logic 18 and RAM 10 there must be provided a circuit for managing addresses in this memory. In addition, since the FIFO queue formed from the RAM constitutes a circular queue, any cross-over of the write and read pointers must be prevented so as to prevent destruction of information or the appearance of erroneous information. This problem is well known, for it arises also in processors as well as the means for resolving it. For this reason, the means intended to supply a full FP or empty FV RAM indication, so as to block respectively any new write-in or any new read-out, will only be briefly described by mentioning essentially the aspects specific to the present invention.

The write and read pointers are incremented at the end of a write or read cycle and then indicate the address of the next word to be written in or read out. An equality of the write pointer PTE and read pointer PTL after a write cycle indicates that the RAM is full and that no additional write-in can be accepted if it is not preceded by at least one read-out. Symmetrically, an equality between PTE and PTL after read-out means that the RAM is empty and that no read-out can be effected from the RAM before a new write-in.

Detection of the full RAM and empty RAM states may be effected by means of AND gates which receive, at one input, a signal indicating the equality of the pointers and, at the other input, a signal indicating that the last operation is a write-out for one of the gates; a signal indicating that the last operation is a read-out for the other gate. The output indications FP and FV appear when a new clock cycle is already in progress. They are used, in the allocation logic (FIG. 6), for preventing a write request to be taken into account in the case FP=1 and a read request in the case FV=1. They stop in addition the cycle in progress if it has been selected by the proscribed operation, by resetting latch 84a or 84b.

Moreover, in the case of a full queue, the output of the write-in square wave signal WM must be inhibited and, for this reason, generation of the signal FP from the positioning of the write pointer must be as rapid as possible so as not to cause the generation of the signal WM to be delayed too long. This square wave WM is intended to supply the signal for writing in memory. It must only be generated after a time δ which follows the leading edge of the clock signal H. It may be obtained by means of a gate providing the logic operation:

$$WM = E \times \overline{FP} \times H_\delta \qquad (2)$$

where $H_\delta$ is the signal H delayed by a value at least equal to δ.

Figure 7:
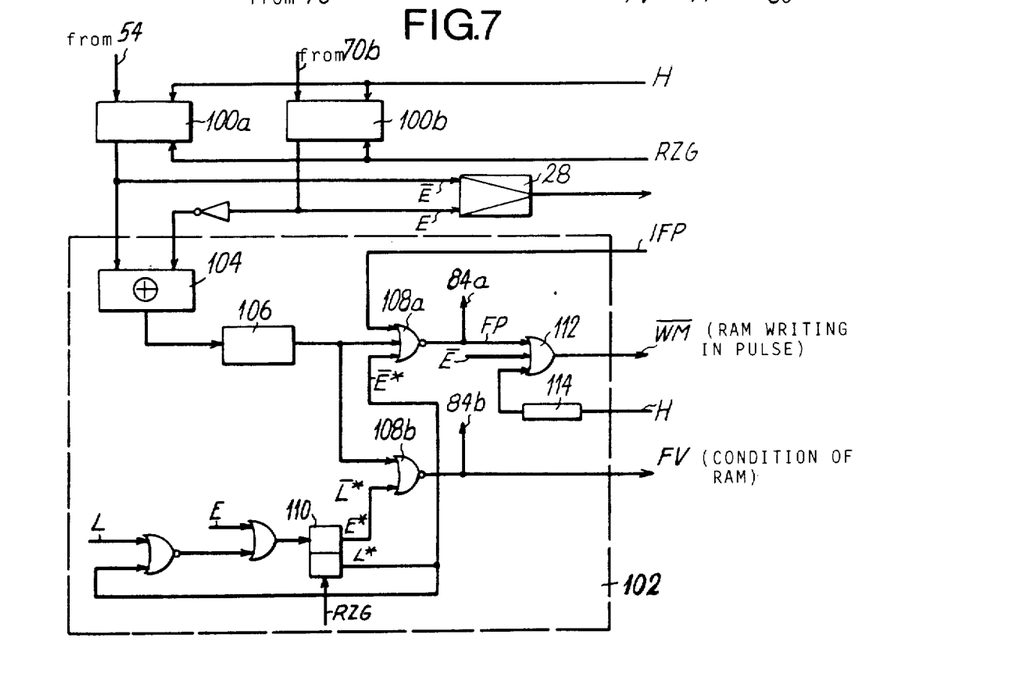
FIG. 7 is a simplified block diagram of a circuit for handling the signal for addressing the RAM memory for write in or read out, said circuit being suitable for use in the embodiment of FIG. 3.

FIG. 7 shows, in an extremely schematized way, a possible construction of the address management circuit. This circuit comprises read and write pointers 100a and 100b whose outputs drive the multiplexer 28 and a limit detection circuit 102. The input elements of this latter is formed by an adder circuit 104 which functions as a subtractor (inversion of one of the input signals) for working out the difference between the values of the two pointers, whose output signal is applied to a gate network 106, disposed so as to correspond to the capacity and to the arrangement of the pointers. These pointers may for example be formed from synchronous counters with fourteen stages, constantly activated by the clock signal H but whose operation is only effective in the case of validation. The pointers comprise a general reset RZG for positioning the whole of the inputs of the counters forming these pointers to 0.

The write pointer PTE indicates the address of the next writing in memory. It is incremented at the end of each write cycle on the leading edge of clock H. Similarly, the read pointer PTL points the next memory word to be read out. It is, like the counter forming the read pointer incremented at the end of the cycle.

The full queue and empty queue detection is provided by two NOR gates 108a and 108b. Gate 108a receives the output signal from the gate network 106 and signal $\bar{E}^*$ coming from a latch 110 whose connection and operation will not be described for they are evident. Gate 108a comprises an additional input IFP which allows the full queue detection function to be inhibited by application of an external level 1 signal. Such inhibition may be necessary for some applications. The NOR gate receives, symmetrically, the output signal from the gate network 106 and the signal $\bar{L}^*$ from latch 110. This gate does not comprise an inhibition input.

An OR gate 112 for generating the write signal WM comprises three inputs. One receives the fullstack signal FP. A second receives the signal $\bar{E}$. A third receives the clock signal through an element 114 providing a delay at least equal to $\delta$, so that gate 112 responds to the above function (2).

Figure 8:
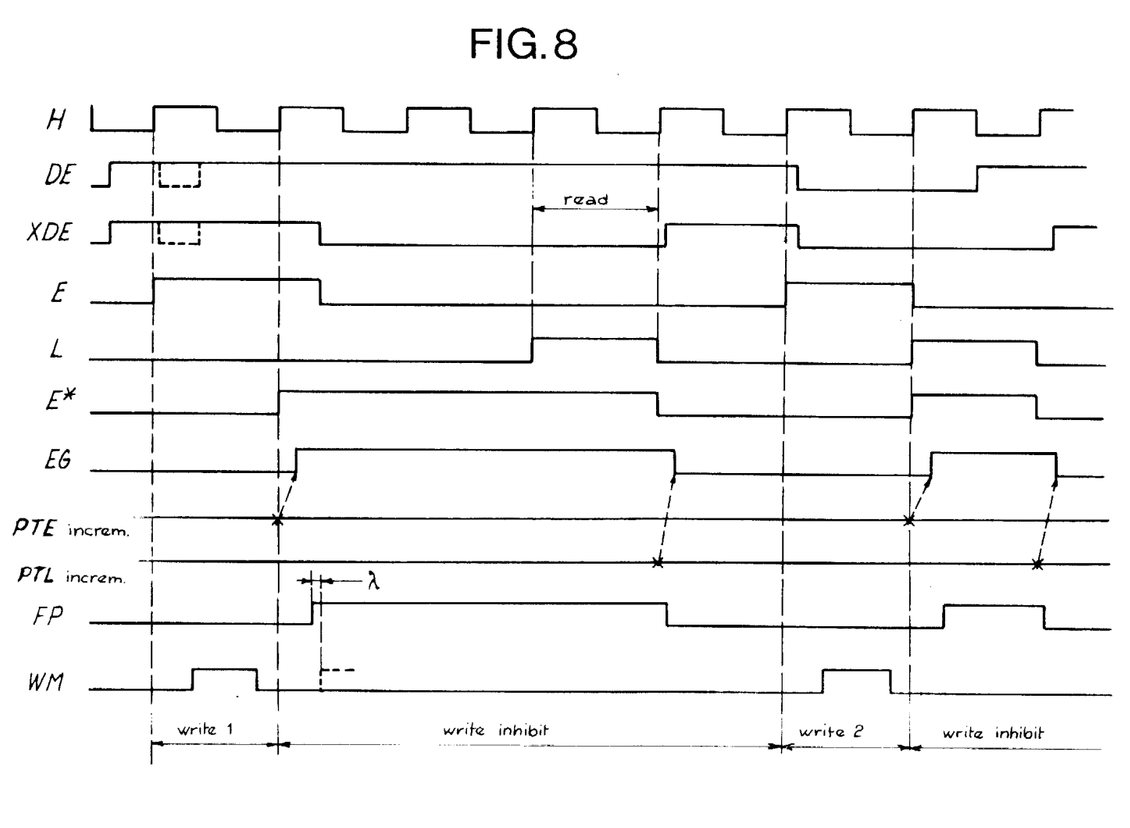
FIG. 8 is a diagram indicating how writing in is inhibited into the RAM memory when the stack is fully loaded, reading out being similarly inhibited when it is detected that the stack is empty.

By way of simple example, there is shown in FIG. 8 the development of the different signals which are used in the operation, when the queue is full after a write operation. In the case shown in FIG. 8, the write cycle 1 fills the stack and causes the appearance of a full RAM indication (passage to 1 of FP). When the next write order appears, it is inhibited after a delay which corresponds to a safety guard and prohibits the appearance of the write signal WM. The inhibition constitutes until the signal E has again passed to level 1. This return to level 1 is enabled by a read operation. A new write cycle may then take place (write cycle 2 in FIG. 8). This write cycle again fills the queue and causes a new inhibition.

The invention is obviously not limited to the embodiments described above by way of examples. It is susceptible of numerous variants and, in particular, the management system may fulfil numerous additional functions, controlling external registers, or input and output registers added to those which have already been mentioned. The essential thing is that this management system should allow the operation for reading data out from the output register (or a register) at any time with respect to the writing of information into the input register (or an input register), the simultaneity of write-in and read-out operations being prohibited and made impossible by inhibition of the write or read operation before execution of the other operation (read or write). It will of course be readily understood that the scope of the present patent extends to such variants, as well generally to all others remaining within the framework of equivalences.

We claim:

1. A FIFO arrangement for temporary data storage which includes:
   a random access memory having an input and an output,
   a control system for said random access memory,
   a first and a second output buffer register connected in series relation to the output of said random access memory,
   a single input buffer register connected to the input of said random access memory,
   wherein said control system includes:
     a first control logic for controlling operation of said input buffer register, having:
       first means for storing write requests one at a time,
       second means for storing the condition of said input buffer register, said second means being operatively associated with additional means arranged for setting said second storing means in response to the presence of an external writing request stored in said first storing means when said second storing means are in a condition indicating that said input buffer register is empty,
       generating means for generating an internal writing request signal and directing it to said random access memory when said second storing means indicate that said input buffer register is loaded and as long as said random access memory has not acknowledged said internal writing request, said generating means being arranged and connected to reset said second storing means into a condition indicating that said input buffer register is empty when said writing request has been acknowledged,
     a second control logic having:
       third storing means for storing the condition of said first output buffer register,
       fourth storing means for storing the condition of said second buffer register,
       supplemental means for generating an internal reading request and directing it to said random access memory when said third storing means are in a condition indicating that the first output buffer register is empty and as long as said reading request has not been acknowledged, and for resetting said thid storing means into a condition indicating that said first output register is loaded as soon as the reading request has been acknowledged,
       a unit for setting said fourth storing means when the third storing means indicate that the first output register is loaded and said fourth storing means indicate that the second output register is empty, said unit being connected to simultaneously reset said third storing means into a condition indicating that said first output buffer register is empty,
       and means for setting said fourth storing means when the latter indicates said second output buffer register is loaded and after an external signal representative of a request for reading out of the said second output buffer register has been delivered,
       and a logic circuit for solving conflicts between an internal writing-in request and an internal reading-out request.

2. A FIFO arrangement according to claim 1, wherein said additional means for setting said second storing means in response to the presence of an external writing request are arranged for setting the first storing means whereby the latter then indicates there is no external writing request which is stored.

3. An arrangement according to claim 1, wherein said generating means for generating an internal writing request is arranged for also delivering said writing request signal responsive to said first storing means being in a condition indicating that an external writing request is stored.

4. An arrangement according to claim 1, wherein said supplemental means for generating an internal reading request and directing it to said random access memory is arranged to also deliver a reading request responsive to said fourth storing means being in a condition indicating said said second output buffer register is empty.

5. A FIFO arrangement for temporary data storage which includes:
- a random access memory having an input and an output,
- a control system for said random access memory,
- a first and second output buffer registers connected in series relating to the output of said random access memory,
- a single input buffer register connected to the input of said random access memory,
- wherein said control system includes:
  - a first control logic for controlling operation of said input buffer register, having:
  - first means for storing write requests one at a time,
  - second means for storing the condition of said input buffer register, said second means being operatively associated with additional means arranged for setting said second storing means in response to the presence of an external writing request stored in said first storing means when said second storing means are in a condition indicating that said input buffer register is empty,
  - generating means for generating an internal writing request signal and directing it to said random access memory responsive to simultaneous receipt of a first enabling signal and a signal from said second storing means indicating that said input buffer register is loaded and as long as said random access memory has not acknowledged said internal writing request, said generating means being arranged and connected to reset said second storing means into a condition indicating said said input buffer register is empty when said writing request has been acknowledged,
  - a second control logic having:
  - third storing means for storing the condition of said first output buffer register,
  - fourth storing means for storing the condition of said second buffer register,
  - supplemental means for generating an internal reading request and directing it to said random access memory responsive to simultaneous receipt of a second enabling signal and a signal from said third storing means indicating that the first output buffer register is empty and as long as said reading request has not been acknowledged, and for resetting said third storing means into a condition indicating that said first output register is loaded as soon as the reading request has been acknowledged,
  - a unit for setting said fourth storing means when the third storing means indicate that the first output register is loaded and said fourth storing means indicate that the second output register is empty, said unit being connected to simultaneously reset said third storing means into a condition indicating said said first output buffer register is empty,
  - and means for setting said fourth storing means when the latter indicates said second output buffer register is loaded and after an internal signal representative of a request for reading out of the said second output buffer register has been delivered,
  - and a logic circuit for solving conflicts between an internal writing-in request and an internal reading-out request and delivering one only of said first and second enabling signals at a time.

6. An arrangement according to claim 5, wherein said logic circuit comprises:
- a first latch connected to deliver said first enabling signal when in set condition,
- a second latch connected to deliver said second enabling signal when in set condition,
- and a mutual exclusion logic for preventing simultaneous setting of said two latches, having first inhibiting gate means for controlling transmission of an internal writing request to said first latch as a set signal thereof, second inhibiting gate means for controlling transmission of an internal reading request to said second latch as a set signal thereof, and a priority circuit for continuously applying complementary binary signal to said inhibiting gate means for causing one only of said inhibiting gate means to stop transmission upon simultaneous application of requests to both said inhibiting gate means.

* * * * *